US009551516B2

(12) United States Patent
Becker et al.

(10) Patent No.: US 9,551,516 B2
(45) Date of Patent: Jan. 24, 2017

(54) COMPRESSOR-HEAT EXCHANGER UNIT FOR A HEATING-COOLING MODULE FOR A MOTOR VEHICLE

(71) Applicant: Magna Powertrain Bad Homburg GmbH, Bad Homburg (DE)

(72) Inventors: Uwe Becker, Butzbach (DE); Jens Dittmar, Usingen (DE); Tilo Schaefer, Daubach (DE); Gholam Reza Zakeri, Bad Vilbel (DE)

(73) Assignee: Magna Powertrain Bad Homburg GmbH, Bad Homburg (DE)

( * ) Notice: Subject to any disclaimer, the term of this patent is extended or adjusted under 35 U.S.C. 154(b) by 173 days.

(21) Appl. No.: 14/374,750

(22) PCT Filed: Jan. 10, 2013

(86) PCT No.: PCT/DE2013/100006
§ 371 (c)(1),
(2) Date: Jul. 25, 2014

(87) PCT Pub. No.: WO2013/113308
PCT Pub. Date: Aug. 8, 2013

(65) Prior Publication Data
US 2015/0013353 A1    Jan. 15, 2015

(30) Foreign Application Priority Data

Feb. 2, 2012 (DE) .................. 10 2012 100 856

(51) Int. Cl.
*F25B 31/00* (2006.01)
*F25B 9/00* (2006.01)
(Continued)

(52) U.S. Cl.
CPC ......... *F25B 31/006* (2013.01); *B60H 1/00342* (2013.01); *B60H 1/3223* (2013.01);
(Continued)

(58) Field of Classification Search
CPC .......... F24F 3/00; F25B 31/006; F25B 41/00; F25B 2309/06; F25B 2500/18; F25B 2400/071; F04B 53/08; F28D 7/14; F28D 7/022; F28D 2021/0068; F28D 2021/008; B60H 1/00342; B60H 1/3223; B60H 1/3227
See application file for complete search history.

(56) References Cited

U.S. PATENT DOCUMENTS 2,121,049 A    6/1938  Price
2,175,914 A *  10/1939 Philipp ................. F25B 23/006
                                                             62/295
(Continued)

FOREIGN PATENT DOCUMENTS

DE    2604942 A1   8/1977
DE    3027356 A1   2/1981
(Continued)

OTHER PUBLICATIONS

International Search Report, Jun. 3, 2013, 5 pages.

*Primary Examiner* — Emmanuel Duke
(74) *Attorney, Agent, or Firm* — Dickinson Wright PLLC

(57) ABSTRACT

The invention relates to a compressor-heat exchanger unit for a heating-cooling module for a motor vehicle, in which at least one fluid serving as a coolant flows, comprising a compressor device for compressing the first fluid, at least one heat exchanger device that has at least one first circuit for the first fluid to flow through and a second circuit for a second fluid to flow through, this heat exchanger unit being arranged in the fluid stream after the compressor device, characterized in that the first fluid is guided at least partially in flow channels of the first circuit that at least partially enclose the compressor device.

16 Claims, 3 Drawing Sheets

(51) Int. Cl.

| | | |
|---|---|---|
| *B60H 1/00* | (2006.01) | |
| *B60H 1/32* | (2006.01) | |
| *F04B 53/08* | (2006.01) | |
| *F28D 7/02* | (2006.01) | |
| *F28D 7/14* | (2006.01) | |
| *F25B 41/00* | (2006.01) | |
| *F25B 13/00* | (2006.01) | |
| *F28D 21/00* | (2006.01) | |

(52) U.S. Cl.
CPC ........... *B60H 1/3227* (2013.01); *F04B 53/08* (2013.01); *F25B 9/008* (2013.01); *F25B 41/00* (2013.01); *F28D 7/022* (2013.01); *F28D 7/14* (2013.01); *F25B 13/00* (2013.01); *F25B 2309/06* (2013.01); *F25B 2339/047* (2013.01); *F25B 2400/071* (2013.01); *F25B 2400/077* (2013.01); *F25B 2500/18* (2013.01); *F28D 2021/008* (2013.01); *F28D 2021/0068* (2013.01)

(56) References Cited

U.S. PATENT DOCUMENTS

| | | | | |
|---|---|---|---|---|
| 2,700,279 | A * | 1/1955 | Stickel | F25B 29/003 62/183 |
| 4,206,805 | A * | 6/1980 | Beckett | F04B 39/06 165/169 |
| 4,248,056 | A * | 2/1981 | Beacham | F25B 31/006 62/238.7 |
| 4,250,717 | A * | 2/1981 | Stone | F25B 31/006 62/279 |
| 4,680,939 | A * | 7/1987 | Rojey | F25B 31/006 252/67 |
| 4,959,975 | A * | 10/1990 | Harris | F24H 4/04 62/238.6 |
| 5,289,698 | A * | 3/1994 | Garimella | B60H 1/00007 62/239 |
| 6,595,011 | B1 * | 7/2003 | Forgy | F24F 5/0035 62/305 |
| 2002/0163785 | A1 | 11/2002 | Brechbill et al. | |
| 2005/0223727 | A1 | 10/2005 | Funahashi et al. | |
| 2009/0014150 | A1 | 1/2009 | Masters et al. | |
| 2011/0289953 | A1 * | 12/2011 | Alston | B60H 1/32 62/238.6 |

FOREIGN PATENT DOCUMENTS

| | | |
|---|---|---|
| DE | 20320643 | 12/2004 |
| EP | 0082764 A1 | 6/1983 |
| EP | 0504455 A1 | 9/1992 |
| GB | 2071294 A | 9/1981 |
| WO | 2011045977 A1 | 4/2011 |

* cited by examiner

COMPRESSOR-HEAT EXCHANGER UNIT FOR A HEATING-COOLING MODULE FOR A MOTOR VEHICLE

BACKGROUND OF THE INVENTION

The invention is based on a priority patent application DE102012100856.6 which is hereby incorporated by reference.

The invention relates to a compressor-heat exchanger unit, in particular to a compressor-heat exchanger unit for a heating-cooling module for a motor vehicle, and to a heating-cooling module having a compressor-heat exchanger unit of this kind, and to a method for operating a heating-cooling module having a compressor-heat exchanger unit of this kind.

In known heating-cooling modules for a motor vehicle, a refrigerant is passed through a refrigerant circuit, wherein this refrigerant circuit generally has at least one compressor, a gas cooler, an internal heat exchanger, an expansion member, an evaporator and a compensating header. These components are connected by refrigerant-carrying tubes, generally in the stated sequence, wherein heat is removed from the refrigerant in the condenser/gas cooler and supplied to the refrigerant in the evaporator. By means of this heat transfer, temperature control especially of the interior of a motor vehicle, of a battery, of a drive motor and/or of an electronic system for the motor vehicle is performed indirectly.

Taking conventional heating-cooling modules for a motor vehicle as a basis, EP 1 990 221 A1 proposes a heating-cooling module in which a condenser/gas cooler, an evaporator and an internal heat exchanger are integrated in such a way that they form a closed unit. This is intended to achieve lower assembly costs and to reduce the length of the installed refrigerant tubes. Here, the "cold" elements in the refrigerant circuit of the heating-cooling module are integrated into a closed unit.

SUMMARY OF THE INVENTION

It is the object of the invention to allow an improved heating-cooling module construction for a motor vehicle, in which a compact arrangement of "hot" elements in the refrigerant circuit of a heating-cooling module is made possible.

This object is achieved by a compressor-heat exchanger unit for a heating-cooling module for a motor vehicle, in which at least one first fluid serving as a refrigerant flows, having a compressor device for compressing the first fluid, at least one heat exchanger device that has at least one first circuit for the first fluid to flow through and a second circuit for a second fluid to flow through, wherein this heat exchanger unit is arranged in the fluid flow after the compressor device, wherein at least one flow channel of the first circuit and at least one flow channel of the second circuit of the heat exchanger device at least partially surround the compressor device.

A heating-cooling module having a compressor-heat exchanger, wherein the first and a second operating state of the compressor-heat exchanger unit being designed in such a way that the heating-cooling module can be operated both as a refrigerator and as a heat pump.

A method for operating a heating-cooling module having a compressor-heat exchanger, wherein the first and a second operating state of the compressor-heat exchanger unit being designed in such a way that the heating-cooling module can be operated both as a refrigerator and as a heat pump, additionally having at least one changeover valve, comprising the following steps: detecting operating parameters of the heating-cooling module by means of the control device, analyzing operating parameters of the heating-cooling module by means of the control device, deciding to choose another operating state of the heating-cooling module on the basis of said analysis, actuating at least one changeover valve for connecting/disconnecting at least one coolant circuit and/or at least one coolant jacket.

In particular, the invention offers the advantage that those components of a heating-cooling module for a motor vehicle which have relatively high temperatures in the refrigerant circuit, relative to the temperatures that occur there, are arranged in a spatially compact manner. It is thereby advantageously possible to minimize unwanted heat transfers in the refrigerant circuit, especially between "hot" and "cold" components of the heating-cooling module, and to give the heating-cooling module smaller dimensions, thereby producing advantages in terms of cost and installation space.

The invention will be described below with reference to a compressor-heat exchanger unit for a heating-cooling module for motor vehicles, in particular for motor vehicles with internal combustion engines but also for motor vehicles driven electrically or by means of a hybrid drive. However, the invention can also be employed for a heating-cooling module of a motor vehicle involving other drive concepts. Moreover, the invention can also be used for heating-cooling modules in stationary applications, especially buildings or the like, or for heating-cooling modules in other applications.

According to one aspect of the invention, the proposal is for a compressor-heat exchanger unit for a heating-cooling module for a motor vehicle, in which at least one fluid serving as a refrigerant flows, having a compressor device for compressing the first fluid, at least one heat exchanger device that has at least one first circuit for the first fluid to flow through and a second circuit for a second fluid to flow through.

This heat exchanger device, which preferably performs the function of a condenser/gas cooler in the refrigerant circuit of the heating-cooling module, is arranged in the fluid flow after the compressor device.

At least one flow channel of the first circuit and at least one flow channel of the second circuit of the heat exchanger device at least partially surround the compressor device.

The first fluid is carried at least partially in flow channels of the first circuit which at least partially surround the compressor device.

In a preferred embodiment, the compressor-heat exchanger unit is installed in the refrigerant circuit of a heating-cooling module between the refrigerant outlet of a compensating header or of an internal heat exchanger and a refrigerant inlet of an expansion member or of an internal heat exchanger.

In another preferred embodiment, the compressor-heat exchanger unit is of substantially cylindrical design. At least one flow channel of the first circuit and at least one flow channel of the second circuit of the heat exchanger device are arranged concentrically in a spiral around a longitudinal axis of the compressor-heat exchanger unit. The compressor device is arranged at least substantially radially to the inside of these flow channels.

As a result, it is possible, in particular, to achieve a compact and therefore space-saving arrangement of the compressor-heat exchanger unit.

The concentricity of these flow channels refers to the radial distance from the longitudinal axis of the compressor-heat exchanger unit. The spiral nature of the flow channels refers to an axial offset of the concentric winding of the flow channels relative to this longitudinal axis.

Particularly to ensure desired heat transfers in a particularly efficient manner and/or to minimize unwanted heat transfers, at least one flow channel of the first circuit and at least one flow channel of the second circuit of the heat exchanger device in a preferred development are arranged in such a way relative to one another that they are formed as countercurrent heat exchangers. As an alternative, the first and second circuits of the heat exchanger device can also be arranged in such a way relative to one another that they are formed as co-current heat exchangers.

Similarly, embodiments of the first and/or of the second circuit with just one or two or three or four flow channels are possible. Connecting various flow channels of the first circuit in parallel and/or in series is possible. Connecting various flow channels of the second circuit in parallel and/or in series is possible.

In a countercurrent heat exchanger, the fluid flowing in the first circuit and the fluid flowing and the second circuit have an at least substantially opposite direction of flow to the respective nearest flow channel containing the other fluid. In a co-current heat exchanger, the fluid flowing in the first circuit and the fluid flowing in the second circuit have at least substantially the same direction of flow as their respective nearest flow channel containing the other fluid.

Particularly to ensure heat exchange by/at components of the motor vehicle which are arranged at a distance from the heating-cooling module, in particular the interior, battery, drive motor and/or electronic system, a fluid serving as a refrigerant is carried in the first circuit, and a fluid serving as a coolant is carried in the second circuit.

The refrigerant circuit is preferably of closed design within the heating-cooling module. The coolant circuit is preferably designed in such a way that a transfer of heat from the heating-cooling module is made possible, depending on the direction of flow and/or temperature of the coolant fed in or discharged.

In another preferred embodiment, either at least one flow channel of the first circuit or at least one flow channel of the second circuit is arranged in such a way that it is substantially surrounded by the other of the two flow channels. A similar embodiment having two, three, four or more flow channels in the first circuit and/or having two, three, four or more flow channels in the second circuit is likewise possible.

This makes it possible, in particular, to make desired heat transfers very efficient.

Particularly to be able to achieve efficient heat transfers at low cost and/or in a compact way and/or with a high degree of reliability in respect of failure during operation, the heat exchanger device in a preferred development is designed as a tube-in-tube heat exchanger, which has at least two flow channels arranged one inside the other, of which at least one flow channel is intended to carry coolant and at least one flow channel is intended to carry refrigerant. Heat transfer preferably takes place over substantially the whole surface of the tube with the smaller surface area, in particular the inner tube. In the present case, the tube-in-tube heat exchangers are made, in particular, from a copper, aluminum or steel material or from combinations of at least two of these and/or of other suitable materials.

As an alternative, the heat exchanger device is designed as a heat exchanger comprising an extruded metal profile, in particular an aluminum alloy or a copper alloy, which has at least two flow channels, of which at least one flow channel is intended to carry coolant and at least one flow channel is intended to carry refrigerant. Preferably, both channels are arranged in such a way relative to one another that the largest possible contact areas and/or a good heat transfer is/are possible.

Other embodiments of a heat exchanger device in which refrigerant-carrying and coolant-carrying flow channels are arranged in such a way that they allow good heat transfer between the flow channels, in particular at least substantially surround one another, are also understood to be included within the scope of the present invention.

In a preferred development, the refrigerant has at least a high proportion of $CO_2$. In particular, the refrigerant consists of $CO_2$ and/or, in particular, corresponds to the specification for R744. The coolant has at least a high proportion of water, in particular consisting substantially thereof.

In particular, such a composition of refrigerant and/or coolant allows particularly environmentally friendly and/or effective operation of the heating-cooling module.

In a preferred development, the coolant is carried in at least one coolant circuit, which has at least two coolant interfaces, by means of which coolant can be fed in and/or discharged.

A transfer of heat from the heating-cooling module is thereby made possible, depending on the direction of flow and/or temperature of the coolant fed in or discharged.

Particularly to enable a compact construction of the compressor-heat exchanger unit to be achieved and/or to minimize energy consumption, the compressor device has a motor, which is designed as an electric motor, in particular as a brushless electric motor, preferably as a brushless external rotor electric motor.

In a preferred development, the compressor device has a housing with a housing cover and at least one housing part, wherein a control device at least for the motor and preferably also for additional controllable components, such as, in particular, a switching device or the like, is arranged on the housing cover.

In particular, this control device is provided for the purpose of sensing and activating operating states of the motor of the compressor device, particularly preferably for switching suitable operating states of the motor of the compressor device that have a retroactive effect, in particular a direct retroactive effect, on the compression performance of the compressor device of the compressor-heat exchanger unit, on the basis of operating parameters, such as user inputs, the temperature of a component of which the temperature is to be controlled, the temperature and/or pressure in flow channels carrying refrigerant or coolant, the temperature of the motor, the temperature outside the vehicle or the like.

Particularly for ensuring energy-efficient cooling of components of the compressor-heat exchanger unit, preferably of the motor and/or of the control device, at least one coolant jacket, in particular just one or two coolant jackets, is/are arranged outside the housing interior at least on one of the housing cover or the housing part, preferably on both. Cooling jackets can be supplied with coolant by means of changeover valves of existing coolant circuits and/or by means of at least two additional coolant connections, preferably connections for a water/glycol mixture. These coolants can preferably be arranged on the control device and/or on the motor of the compressor device and can be switched over together or separately to enable them to be used as a heat source.

A coolant jacket, which at least partially surrounds the housing part, is preferably arranged outside the housing interior on the housing part, and/or coolant can be fed to the coolant jacket through a third coolant interface and coolant can be discharged through a fourth coolant interface in a first operating state of the compressor-heat exchanger unit.

In the present case, a coolant interface is to be understood to be a device at which at least one flow channel for carrying coolant outside the compressor-heat exchanger unit is arranged fluidtightly on at least one flow channel for carrying coolant in the compressor-heat exchanger unit. This allows coolant to be fed into the compressor-heat exchanger unit and/or coolant to be discharged from the compressor-heat exchanger unit. Here, the fluidtight connection between the flow channels is preferably made by joining methods, by means of welding, soldering, screwing, shrink-fitting, adhesive bonding and/or the like.

In particular, this allows flexible use of the compressor-heat exchanger unit as a supplier of heat in relation to the temperature of a component of which the temperature is to be controlled.

A switching device for switching over between the first and the second operating state is preferably provided, wherein a sequence of flow through the heat exchanger device and/or through in each case at least one coolant jacket on a housing part and/or on the housing cover can be changed by the changeover operation. In particular, at least one, in particular just one or two, switchable and/or controllable valves is/are provided.

In particular, the compressor device is designed as a piston compressor, particularly preferably as a radial piston compressor, and is preferably arranged within a pressure-tight housing.

According to one aspect of the invention, a proposal is made for a heating-cooling module in which the first and the second operating state of the compressor-heat exchanger unit are designed in such a way that the heating-cooling module can be operated both as a refrigerator and as a heat pump.

This makes possible flexible use, in particular, of the heating-cooling module as a refrigerator and/or as a heat pump.

According to one aspect of the invention, a proposal is made for a method for operating a heating-cooling module having a compressor-heat exchanger unit, wherein the heating-cooling module additionally has at least one changeover valve. This method has at least the following steps:
  detecting operating parameters of the heating-cooling module, in particular by means of sensors of the control device,
  analyzing operating parameters of the heating-cooling module by means of the control device,
  deciding to choose another operating state of the heating-cooling module on the basis of said analysis,
  actuating at least one changeover valve for connecting/disconnecting at least one coolant circuit and/or at least one coolant jacket.

Various operating states of the heating-cooling module can be distinguished, in particular, by means of different positions of at least one changeover valve and/or by means of the prevailing directions of flow preferably resulting therefrom of the coolant and/or refrigerant in the flow channels. In addition or as an alternative, it is also possible in accordance with the invention to understand operating states of the motor and/or of the compressor-heat exchanger unit as operating states of the heating-cooling module.

According to the invention, operating parameters are, in particular, user inputs, the temperature of a component of which the temperature is to be controlled, the temperature and/or pressure in flow channels carrying refrigerant or coolant, the temperature of the motor, and the temperature outside the vehicle or the like.

BRIEF DESCRIPTION OF THE DRAWINGS

Illustrative embodiments of the invention will become apparent from the following descriptions in conjunction with the figures, of which, in particular and in a partially schematic way.

DETAILED DESCRIPTION OF THE DRAWINGS

Figure 1:
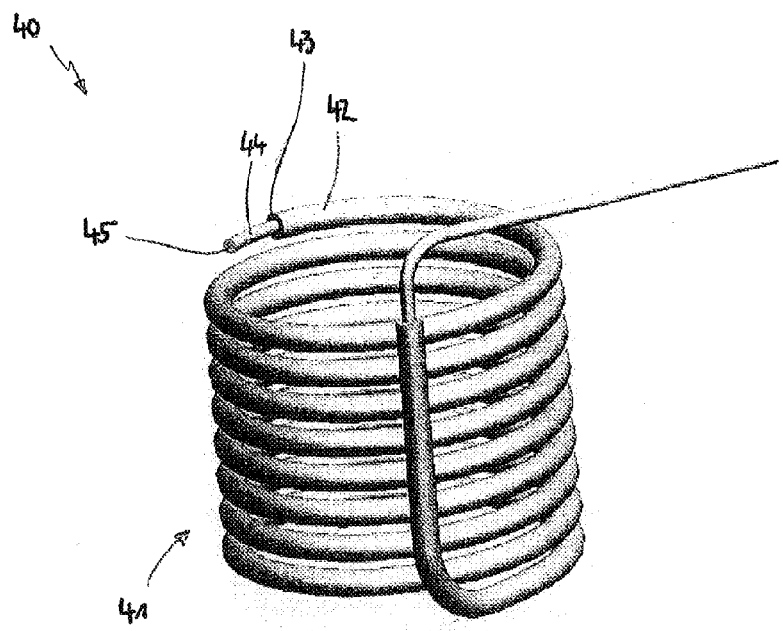
FIG. 1: shows a perspective view of an illustrative heat exchanger device of a compressor-heat exchanger unit according to the invention.

FIG. 1 shows an illustrative embodiment of a heat exchanger device 40 designed as a tube-in-tube heat exchanger in an illustrative compressor-heat exchanger unit 1 according to the invention. This tube-in-tube heat exchanger 40 has a double tube 41 bent in a spiral, wherein the individual turns of the double tube 41 are arranged concentrically around the longitudinal axis L of the compressor-heat exchanger unit 1 in the spiral region of said double tube. The double tube 41 has an inner tube 44 and an outer tube 42. The inner tube 44 delimits an inner tube volume 45 with respect to an outer tube volume 43, wherein the outer tube volume 43 is delimited by the outer tube 42 with respect to the environment of the tube-in-tube heat exchanger 40.

In this illustrative embodiment, refrigerant, in this case R744 (or CO2), in the inner tube volume 45 flows in the opposite direction to the coolant, in this case a water/glycol mixture, which flows in the outer tube volume 43.

In the other illustrative embodiments, it is envisaged that coolant will flow in the inner tube volume 45 and refrigerant will flow in the outer tube volume 43, and/or that the refrigerant and the coolant will flow through the tube-in-tube heat exchanger 40 in the same direction.

Figure 2:
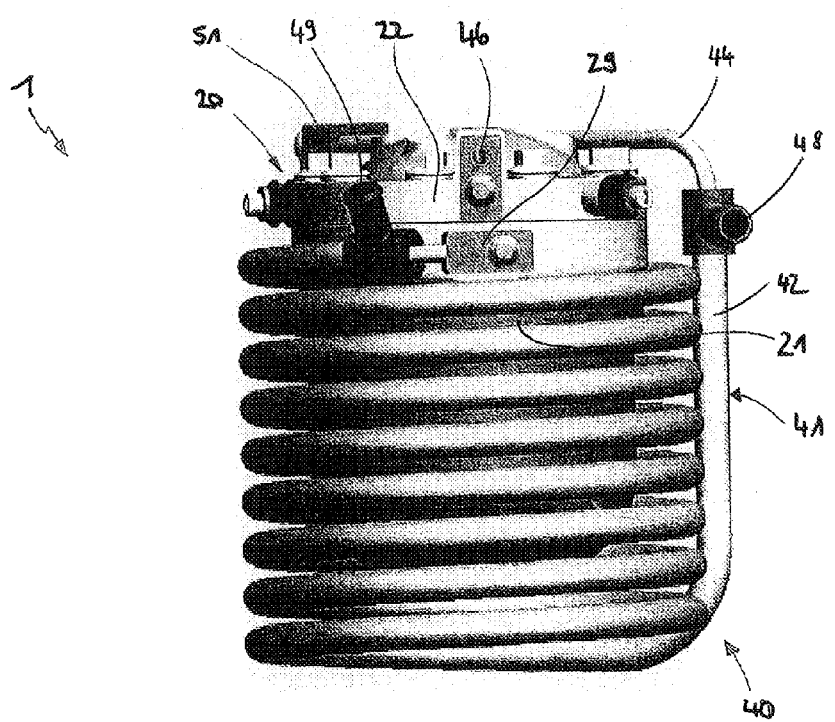
FIG. 2: shows a perspective side view of an illustrative compressor-heat exchanger unit according to the invention.
Figure 3:
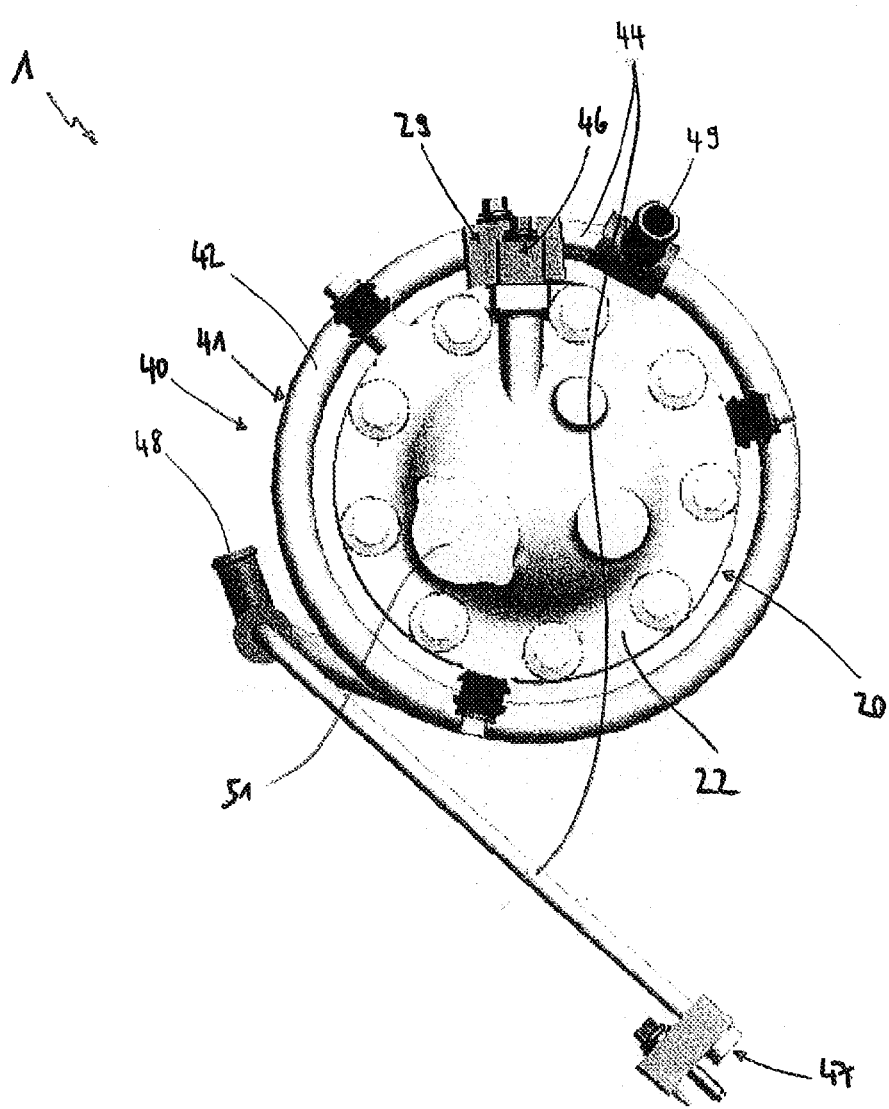
FIG. 3: shows a perspective plan view of the illustrative compressor-heat exchanger unit according to the invention shown in FIG. 2, and FIG. 4: shows a partially sectioned view of another illustrative compressor-heat exchanger unit according to the invention.

FIGS. 2 and 3 show different perspective views of an illustrative compressor-heat exchanger unit 1 according to the invention, in which the tube-in-tube heat exchanger from FIG. 1 can be installed as a heat exchanger device 40. The heat exchanger device 40 is arranged substantially radially around the compressor device 20 and is connected to the latter in respect of the refrigerant flow by means of a first refrigerant interface 29. The first refrigerant interface 29 is designed in such a way that the geometric fixing of the heat exchanger device 40 and the compressor device 20 relative to one another is also accomplished thereby.

In this illustrative embodiment, the compressor device 20 has a radial piston compressor (not shown), which is arranged in a volume delimited by a housing part 21 and a housing cover 22. The compressor device 20 is supplied via a second refrigerant interface 46 with refrigerant (R744 or CO2), which is compressed by means of the radial piston compressor and then flows via the first refrigerant interface 29 from the compressor device 20 to the heat exchanger device 40.

In the heat exchanger device 40, the refrigerant flows in the inner tube 44 of a double tube 41 as far as the third refrigerant interface 47 and, in the process, exchanges thermal energy with a coolant, which flows in the outer tube 42 of the double tube 41 counter to the direction of flow of the refrigerant. The coolant is fed in via the first coolant interface 48 of the double tube 41 and discharged via the second coolant interface 49 of the double tube 41.

A connection 51 for a control device (not shown in this figure) is arranged on the housing cover 22.

Figure 4:
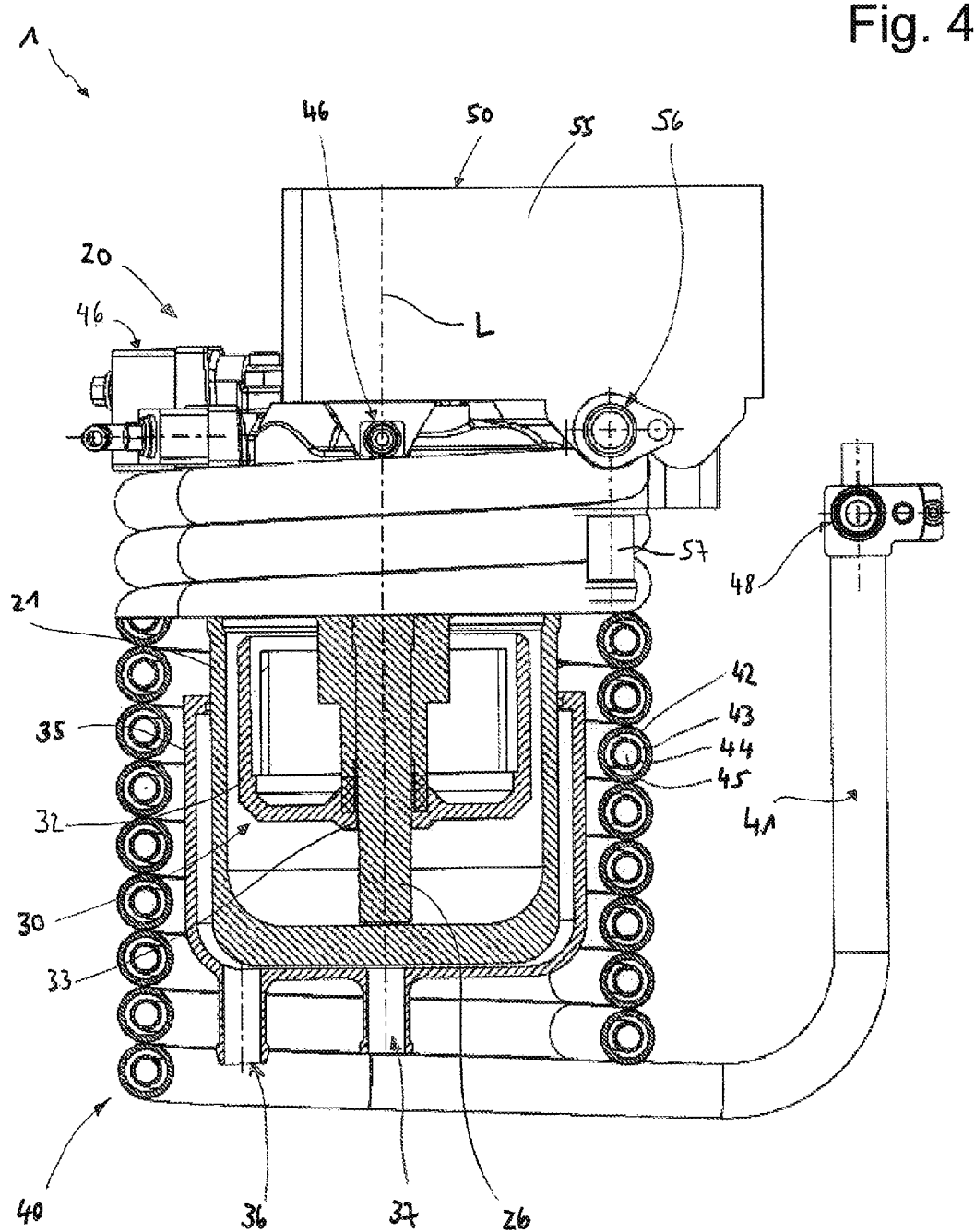

FIG. 4 shows a partially sectioned view of another illustrative compressor-heat exchanger unit 1 according to the invention, wherein a motor 30 designed as a brushless external rotor electric motor is shown in the sectioned region. The motor 30 has an external rotor 32, which is connected by means of a joint 33 for conjoint rotation to a non-eccentric region of the eccentric shaft 26 of the compressor device 20.

The motor 30 of this compressor device 20 is cooled by means of a first coolant jacket 35, which is arranged outside the volume enclosed by the housing 21, 22. Coolant is fed into/discharged from the first coolant jacket 35 via coolant interfaces 36, 37, wherein the coolant flows in a volume between the two coolant interfaces 36, 37 which is delimited by the first coolant jacket 35 and the housing part 21.

A control device 50 is arranged on the housing cover 22 of the compressor device 20. In particular, this controls operating states of the motor, preferably on the basis of user inputs, the temperature of a component of which the temperature is to be controlled, the temperature and/or pressure in flow channels carrying refrigerant or coolant, the temperature of the motor, the temperature outside the vehicle or the like, wherein these operating states of the motor are detected by means of suitable sensor devices connected to the control device, in particular temperature sensors and/or pressure sensors and/or operating elements for users.

The control device 50 can be connected electrically to a power source by means of a connection (not shown) and can preferably additionally be connected to data processing devices outside the compressor-heat exchanger unit 1 for unidirectional/bidirectional data transmission.

A second coolant jacket 55, through which it is likewise possible for a coolant to flow, is arranged on the control device and the housing cover 22 for the purpose of cooling the control device 50, wherein the coolant is fed in and discharged via the fifth and sixth coolant interfaces 56, 57.

LIST OF REFERENCE SIGNS 1 compressor-heat exchanger unit
20 compressor device
21 housing part
22 housing cover
26 eccentric shaft of the compressor
29 first refrigerant interface (of the compressor device for the heat exchanger device)
30 motor
32 external rotor of motor
33 joint for conjoint rotation between the support and the eccentric shaft of the compressor
35 coolant jacket for motor
36 third coolant interface
37 fourth coolant interface
40 heat exchanger device
41 double tube
42 outer tube
43 outer tube volume
44 inner tube
45 inner tube volume
46 second refrigerant interface (from the internal heat exchanger or from the compensating header to the compressor device)
47 third refrigerant interface (from the heat exchanger device to the internal heat exchanger or to the expansion member)
48 first coolant interface
49 second coolant interface
50 control device
55 coolant jacket for control device
56 fifth coolant interface
57 sixth coolant interface
L longitudinal axis of the compressor-heat exchanger unit

The invention claimed is:

1. A compressor-heat exchanger unit for a heating-cooling module for a motor vehicle, in which at least one first fluid serving as a refrigerant flows, the compressor-heat exchanger unit comprising:
   a compressor device for compressing the first fluid,
   at least one heat exchanger device that has at least one first circuit for the first fluid to flow through and a second circuit for a second fluid to flow through,
   wherein the heat exchanger unit is arranged in the fluid flow after the compressor device,
   wherein at least one flow channel of the first circuit and at least one flow channel of the second circuit of the heat exchanger device at least partially surround the compressor device,
   the compressor device including a housing and a motor disposed within the housing,
   a controller arranged on the housing to control an operating state of the motor, and
   a coolant jacket arranged on the housing and disposed in at least partially surrounding relationship with the controller for cooling the controller.

2. The compressor-heat exchanger unit as claimed in claim 1, wherein the compressor-heat exchanger unit is of substantially cylindrical design, and the at least one flow channel of the first circuit and the at least one flow channel of the second circuit of the heat exchanger device are arranged concentrically in a spiral around a longitudinal axis of the compressor-heat exchanger unit, and the compressor device is arranged at least substantially radially to the inside of the at least one flow channels of the first and second circuits.

3. The compressor-heat exchanger unit as claimed in claim 1, wherein the at least one flow channel of the first circuit and at least one flow channel of the second circuit are arranged relative to one another to form countercurrent heat exchangers or co-current heat exchangers.

4. The compressor-heat exchanger unit as claimed in claim 3, wherein a fluid designed as a refrigerant is carried in the first circuit, and a fluid designed as a coolant is carried in the second circuit.

5. The compressor-heat exchanger unit as claimed in claim 3, wherein either the at least one flow channel of the first circuit or the at least one flow channel of the second circuit is arranged in surrounding relationship by the other of the two flow channels.

6. The compressor-heat exchanger unit as claimed in claim 1, wherein the heat exchanger device is designed as a tube-in-tube heat exchanger.

7. The compressor-heat exchanger unit as claimed in claim 1, wherein the heat exchanger device is designed as a heat exchanger comprising an extruded metal profile, in particular an aluminum alloy or a copper alloy.

8. The compressor-heat exchanger unit as claimed in claim 1, wherein the refrigerant has at least a high proportion of $CO_2$, in particular consisting substantially thereof, and/or the coolant has at least a high proportion of a water/glycol mixture, in particular consisting substantially thereof.

9. The compressor-heat exchanger unit as claimed in claim 1, wherein the coolant is carried in at least one coolant circuit including at least two coolant interfaces for feeding in and discharging the coolant.

10. The compressor-heat exchanger unit as claimed claim 1, wherein the motor is a brushless electric motor having an external rotor.

11. The compressor-heat exchanger unit as claimed in claim 10, wherein the compressor device has a housing with a housing cover and at least one housing part, and wherein a control device for the motor is arranged on the housing cover and the motor is disposed within the at least one housing part.

12. The compressor-heat exchanger unit as claimed in claim 11, wherein wherein coolant can be fed to the coolant jacket through a third coolant interface and coolant can be discharged through a fourth coolant interface in a first operating state of the compressor-heat exchanger unit.

13. The heating-cooling module unit as claimed in claim 12, wherein the heating-cooling module can be operated both as a refrigerator and as a heat pump.

14. The compressor-heat exchanger unit as claimed in claim 12, further including an additional coolant jacket arranged on the housing part and disposed in at least partially surrounding relationship with the motor for cooling the motor during operation.

15. A compressor-heat exchanger unit for a heating-cooling module for a motor vehicle, in which at least one first fluid serving as a refrigerant flows, the compressor-heat exchanger unit comprising:
a compressor device for compressing the first fluid,
at least one heat exchanger device including at least one first circuit for the first fluid to flow through and a second circuit for a second fluid to flow through,
the first circuit including at least one flow channel and the second circuit including at least one flow channel, the flow channels each disposed in at least partially surrounding relationship with the compressor device,
the compressor device including a housing having a housing cover and a housing part,
a motor disposed within the housing part,
a first coolant jacket at least partially surrounding the housing part and arranged around the motor for cooling the motor,
a control device disposed on the housing for controlling the motor, and
a second coolant jacket at least partially surrounding the control device for cooling the control device.

16. The compressor-heat exchanger unit as claimed in claim 15, wherein the control device for the motor is disposed on the housing cover.

* * * * *